United States Patent
Avramidis

(10) Patent No.: US 10,336,883 B2
(45) Date of Patent: Jul. 2, 2019

(54) COMPOSITIONS PREPARED USING AN IONIC CROSSLINKING AGENT AND METHODS OF MAKING THE SAME

(71) Applicant: BASF SE, Ludwigshafen (DE)

(72) Inventor: Kostas S. Avramidis, Charlotte, NC (US)

(73) Assignee: BASF SE, Ludwigshafen (DE)

(*) Notice: Subject to any disclaimer, the term of this patent is extended or adjusted under 35 U.S.C. 154(b) by 219 days.

(21) Appl. No.: 15/106,751

(22) PCT Filed: Dec. 17, 2014

(86) PCT No.: PCT/EP2014/078222
§ 371 (c)(1),
(2) Date: Jun. 20, 2016

(87) PCT Pub. No.: WO2015/091648
PCT Pub. Date: Jun. 25, 2015

(65) Prior Publication Data
US 2017/0002172 A1   Jan. 5, 2017

Related U.S. Application Data

(60) Provisional application No. 61/919,285, filed on Dec. 20, 2013.

(51) Int. Cl.
| | |
|---|---|
| *C08K 3/26* | (2006.01) |
| *C08K 3/00* | (2018.01) |
| *C08F 212/08* | (2006.01) |
| *C08F 236/10* | (2006.01) |
| *C08L 95/00* | (2006.01) |
| *C08J 3/24* | (2006.01) |
| *C08F 112/08* | (2006.01) |
| *C08K 3/011* | (2018.01) |

(52) U.S. Cl.
CPC .............. *C08K 3/26* (2013.01); *C08F 112/08* (2013.01); *C08F 212/08* (2013.01); *C08F 236/10* (2013.01); *C08J 3/246* (2013.01); *C08K 3/011* (2018.01); *C08L 95/00* (2013.01); *C08J 2395/00* (2013.01); *C08J 2409/08* (2013.01); *C08J 2425/06* (2013.01); *Y02A 30/333* (2018.01)

(58) Field of Classification Search
CPC ...................................................... C08L 95/00
See application file for complete search history.

(56) References Cited

U.S. PATENT DOCUMENTS

| | | | |
|---|---|---|---|
| 4,600,635 A * | 7/1986 | Wiercinski | B32B 11/04 428/220 |
| 5,770,648 A | 6/1998 | Antonelli | |
| 5,981,011 A | 11/1999 | Overcash et al. | |
| 8,895,658 B2 | 11/2014 | Dandreaux et al. | |
| 2005/0027071 A1 | 2/2005 | Deeter | |
| 2006/0063871 A1 | 3/2006 | Taylor | |
| 2009/0326189 A1 | 12/2009 | Tazzia | |
| 2012/0152459 A1 | 6/2012 | Avramidis | |
| 2016/0032138 A1 | 2/2016 | Avramidis | |
| 2016/0046810 A1 | 2/2016 | Avramidis | |

FOREIGN PATENT DOCUMENTS

| | | |
|---|---|---|
| EP | 0393871 A1 | 10/1990 |
| FR | 2139136 A1 | 1/1973 |
| FR | 2359880 A1 | 2/1978 |
| GB | 1382490 A | 2/1975 |
| GB | 1529274 A | 10/1978 |
| JP | S5840349 A | 3/1983 |
| WO | 98/18839 A1 | 5/1998 |
| WO | 2005123796 A1 | 12/2005 |
| WO | 2014139999 A1 | 9/2014 |
| WO | 2014140016 A1 | 9/2014 |

OTHER PUBLICATIONS

Machine translation of JP S58-40349 (Year: 1983).*
International Search Report and Written Opinion of the International Searching Authority for International Application No. PCT/EP2014/078222, dated Feb. 25, 2015, 8 pages.
Moles, Peter J., MEL Chemicals. Data Sheet 117. The Use of Zirconium in Surface Coatings. 2002, 6 pages.

* cited by examiner

*Primary Examiner* — Wenwen Cai
(74) *Attorney, Agent, or Firm* — Meunier Carlin & Curfman LLC

(57) ABSTRACT

Disclosed herein are compositions comprising an ionic crosslinking agent (e.g., compositions comprising crosslinked products prepared by ionically crosslinking a polymer derived from styrene and optionally butadiene using an ionic crosslinking agent). The present disclosure also relates to methods of making the disclosed compositions. The compositions disclosed herein can be used in a variety of applications including, but not limited to, asphalt compositions, paints, coatings, carpet compositions, paper binding and coating compositions, foams, or adhesives.

16 Claims, 8 Drawing Sheets

US 10,336,883 B2

COMPOSITIONS PREPARED USING AN IONIC CROSSLINKING AGENT AND METHODS OF MAKING THE SAME

CROSS-REFERENCE TO RELATED APPLICATIONS

This application is a national stage application of PCT/EP2014/078222, filed Dec. 17, 2014, which claims the benefit of U.S. Provisional Application No. 61/919,285, filed Dec. 20, 2013, the disclosure of which is hereby incorporated by reference in its entirety.

FIELD OF THE DISCLOSURE

The present disclosure relates to compositions prepared by using an ionic crosslinking agent. The present disclosure also relates to methods of making the disclosed compositions.

BACKGROUND

Certain applications using crosslinking agents, for instance, asphalt modifications using sulfur-based crosslinking agents, require a minimum temperature to activate the crosslinking agent. For instance, many products comprising sulfur-based crosslinking agents require a minimum activation temperature of 120° C. or greater. Thus, particularly for asphalt, sulfur-based crosslinking agents are used in hot-mix applications (from 160° C.-200° C.). In addition, sulfur-based crosslinking agents are less effective for certain lower temperature applications (such as warm-mix asphalt applications conducted at temperatures ranging from 120° C.-160° C.). Further, when sulfur-based crosslinking agents mix with asphalt at temperatures of 130° C. or higher, an undesirably byproduct of hydrogen sulfide can be emitted as a reaction product of sulfur and bitumen. Therefore, producing compositions based on crosslinking agents that do not require high temperatures for activation is desirable.

SUMMARY OF THE DISCLOSURE

Disclosed herein are compositions comprising an ionic crosslinking agent. In some embodiments, the compositions comprise a crosslinked product prepared by ionically crosslinking a polymer derived from styrene and optionally butadiene using an ionic crosslinking agent. The sites for ionic crosslinking can be provided by the polymer. In some embodiments, the composition comprises asphalt, and sites for ionic crosslinking can be provided by the asphalt. In some embodiments, the polymer is polystyrene (i.e., polystyrene homopolymer). In some embodiments, the polymer comprises styrene and butadiene and is a styrene-butadiene copolymer, such as a carboxylated styrene-butadiene copolymer or a non-carboxylated styrene-butadiene copolymer. The styrene-butadiene copolymer can be a random copolymer or a block copolymer. The composition can be an aqueous dispersion or emulsion. The composition can have a solids content of at least 50% to 90%. In some embodiments, the composition has a viscosity of 40 cP to 5,000 cP at 20° C.

The ionic cross-linking agent can have a valency of at least 2 (e.g., at least 3, at least 4). In some embodiments, the ionic crosslinking agent includes zirconium. In some embodiments, the composition includes 0.01% to 5% by weight (e.g., 0.01% to 1%, by weight) of the ionic crosslinking agent. In some embodiments, the composition is free of sulfur.

Also disclosed herein are compositions comprising asphalt and an ionic crosslinking agent. The compositions can further comprise water and be in the form of a dispersion or emulsion comprising asphalt and the ionic crosslinking agent.

Further disclosed herein are compositions comprising a polymer derived from styrene and optionally butadiene and an ionic crosslinking agent. The compositions can further comprise water and be in the form of a dispersion or emulsion comprising the polymer and the ionic crosslinking agent.

Also disclosed herein are paints, coatings, paper bindings or coatings, foams, adhesives, powders, carpet compositions, and asphalt compositions comprising the compositions disclosed herein. In some embodiments, the asphalt compositions disclosed herein have an SHRP high temperature that is at least one performance grade improvement over an identical asphalt composition without the ionic crosslinking agent.

Also disclosed herein are methods of preparing the compositions disclosed herein. Disclosed herein are methods of preparing compositions comprising crosslinking a polymer comprising styrene and optionally butadiene using an ionic crosslinking agent to form a crosslinked product. The polymer can be formed using emulsion polymerization, e.g., at an emulsion temperature of 5° C. to 90° C. (e.g., 40° C. to 90° C.). Also disclosed herein are methods of producing a crosslinked asphalt composition, comprising, blending a polymer comprising styrene and optionally butadiene, an ionic crosslinking agent, and asphalt (e.g., as an asphalt emulsion) at a temperature of 5° C. to 200° C. (e.g., 5° C. to 160° C., 5° C. to 120° C., 5° C. to 90° C., 5° C. to 60° C., or ambient temperature) to form an asphalt blend, and crosslinking the asphalt blend to form a crosslinked asphalt composition. The asphalt, polymer, and ionic crosslinking agent can be blended in any order. In some embodiments, the polymer, the asphalt, or both is provided as an aqueous dispersion or emulsion or a non-aqueous dispersion or emulsion.

The details of one or more embodiments are set forth in the description below. Other features, objects, and advantages will be apparent from the description, the figures and the claims.

DETAILED DESCRIPTION

Figure 1:
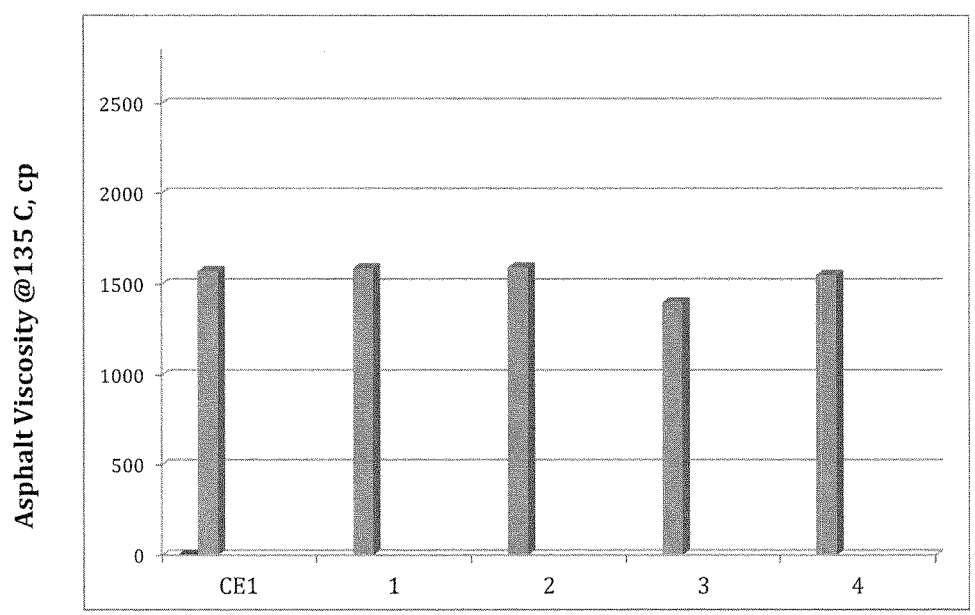
FIG. 1 provides the asphalt viscosity measured in centipoise at 135° C. for the resulting asphalt preparations using different amounts of the ionic crosslinking agent (Examples 1-4), with reference to a control using a sulfur-based asphalt (Comparative Example CE1), with carboxylated styrene-butadiene copolymers.

Disclosed herein are compositions comprising an ionic crosslinking agent. In some embodiments, the compositions comprise a crosslinked product prepared using an ionic crosslinking agent. The composition can include, for instance, a polymer derived from styrene and optionally butadiene and an ionic crosslinking agent, and the polymer provides the sites (e.g., anionic moieties) for ionic crosslinking The composition can include, for instance, asphalt and ionic crosslinking agent, and the asphalt can provide sites for ionic crosslinking The composition can include, for instance, a polymer derived from styrene and optionally butadiene, an ionic crosslinking agent, and asphalt, and the asphalt and polymer can both provide the sites for ionic crosslinking.

In some embodiments, the composition comprises a crosslinked product prepared by ionically crosslinking a polymer derived from (i.e., polymerized from) styrene and optionally butadiene using an ionic crosslinking agent. In some embodiments, the polymer is derived from styrene in an amount of 2% by weight or greater (e.g., 5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, or 95% or greater). In some embodiments, the polymer is derived from 100%, by weight, styrene, i.e., is a polystyrene homopolymer. In some embodiments, the polymer is derived from styrene in an amount of 100%, by weight, or less of styrene (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). In some embodiments, the polymer is derived from styrene in an amount of 2% to 100%, by weight (e.g., 5% to 95%, 10% to 90%, 20% to 80%, 30% to 70%, or 40% to 60%).

The polymer can further be derived from butadiene. The polymer can be derived from, in some embodiments, butadiene in an amount of 0% by weight or greater of butadiene (e.g., 5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, or 95% or greater). The polymer can be derived from, in some embodiments, butadiene in an amount of 98% by weight or less (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). In some embodiments, the polymer is derived from butadiene in an amount of greater than 0% to 98%, by weight (e.g., 5% to 95%, 10% to 90%, 20% to 80%, 30% to 70%, or 40% to 60%). In embodiments wherein the polymer is derived from both styrene and butadiene, the polymer can be referred to as a styrene-butadiene copolymer. The polymer derived from styrene and optionally butadiene can be prepared by any polymerization method known in the art. In some embodiments, the polymer derived from styrene and optionally butadiene can be in the form of a copolymer dispersion (i.e., a latex), which can be made by any method known in the art.

In some embodiments, the polymer can be derived from one or more additional monomers. The one or more additional monomers can include a carboxylic acid monomer. In some embodiments, the polymer is a carboxylated styrene-butadiene copolymer derived from a carboxylic acid monomer. For example, the carboxylated styrene-butadiene copolymer can be derived from 0.5%-10% (e.g., 1-9%, or 2-8%) by weight of a carboxylic acid monomer. Suitable carboxylic acid monomers include, but are not limited to, (meth)acrylic acid, itaconic acid, fumaric acid, or mixtures thereof. The term "(meth)acryl . . . " includes "acryl . . . , " "methacryl . . . , " or mixtures thereof. In some embodiments, the styrene-butadiene copolymer is a non-carboxylated styrene-butadiene copolymer and is not derived from a carboxylic acid monomer.

The additional monomers can include other monomers, for example, other vinylaromatic compounds (e.g., α-methylstyrene, o-chlorostyrene, and vinyltoluene); isoprene; anhydrides of α, β-monoethylenically unsaturated monocarboxylic and dicarboxylic acids (e.g., maleic anhydride, itaconic anhydride, and methylmalonic anhydride); other alkyl-substituted acrylamides (e.g., N-tert-butylacrylamide and N-methyl(meth)acrylamide); vinyl and vinylidene halides (e.g., vinyl chloride and vinylidene chloride); vinyl esters of C1-C18 monocarboxylic or dicarboxylic acids (e.g., vinyl acetate, vinyl propionate, vinyl N-butyrate, vinyl laurate and vinyl stearate); C1-C4 hydroxyalkyl esters of C3-C6 monocarboxylic or dicarboxylic acids, especially of acrylic acid, methacrylic acid, or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); and monomers containing glycidyl groups (e.g., glycidyl methacrylate), linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-N-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate, and sulfopropyl methacrylate); vinylphosphonic acid, dimethyl vinylphosphonate, and other phosphorus monomers (e.g., phosphoethyl (meth)acrylate); alkylaminoalkyl (meth)acrylates or alkylaminoalkyl(meth)acrylamides or quaternization products thereof (e.g., 2-(N,N-dimethylamino)ethyl (meth)acrylate, 3'(N,N-dimethylamino)propyl (meth)acrylate, 2-(N,N,N-trimethylammonium)ethyl (meth) acrylate chloride, 2-dimethylaminoethyl(meth)acrylamide, 3-dimethylaminopropyl(meth)acrylamide, and 3-trimethylammoniumpropyl(meth)acrylamide chloride); allyl esters of C1-C30 monocarboxylic acids; N-Vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazo line, N-vinylcaprolactam, vinylcarbazo le, 2-vinylpyridine, and 4-vinylpyridine); monomers containing 1,3-diketo groups (e.g., acetoacetoxyethyl(meth)acrylate or diacetonacrylamide); monomers containing urea groups (e.g., ureidoethyl (meth)acrylate, acrylamidoglycolic acid, and methacrylamidoglyco late methyl ether); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms such as, vinyl 2-ethylhexanoate, vinyl neo-nonanoate, vinyl neo-decanoate, vinyl neo-undecanoate, vinyl neo-dodecanoate and mixtures thereof, and copolymerizable surfactant monomers (e.g., those sold under the trademark ADEKA REASOAP). In some embodiments, the one or more additional monomers include (meth)acrylonitrile, (meth)acrylamide, or a mixture thereof. In some embodiments, the polymer comprises the one or more additional monomers in an amount of greater than 0% to 10%, by weight (e.g., 0.5%-10%, 0.5%-5%, 0.5%-4%, 0.5%-3%, 0.5%-2%, or 0.5%-1%). In some embodiments, the polymer is further derived from glycidyl methacrylate. For example, the polymer can be derived from 0.01% to 20%, by weight of the polymer, of glycidyl methacrylate.

The polymer derived from styrene and optionally butadiene can also be derived from crosslinking monomers. Exemplary crosslinking monomers include, but are not limited to, N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking agents can include, for instance, diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, and mixtures thereof. In some embodiments, the crosslinking monomers include alkylene glycol diacrylates, dimethacrylates, and/or divinylbenzene. In some embodiments, the polymer is further derived from N-methylolacrylamide. For example, the polymer can be derived from 0.01% to 5%, by weight of the polymer, of N-methylolacrylamide. The polymer comprising styrene and optionally butadiene can be a random copolymer, such as a random carboxylated styrene-butadiene latex copolymer or a random non-carboxylated styrene-butadiene latex copolymer. In some embodiments, the polymer is a block copolymer and can include styrene blocks, butadiene blocks, or blocks that include styrene and/or butadiene and optionally additional monomers such as carboxylic acid monomers and the one or more additional monomers mentioned herein. For example, the styrene-butadiene copolymer can be a styrene-butadiene block copolymer or a styrene-butadiene-styrene block copolymer.

The compositions disclosed herein can be prepared by any polymerization method known in the art. In some embodiments, the compositions disclosed herein are prepared by a dispersion, a mini-emulsion, or an emulsion polymerization. The compositions disclosed herein can be prepared, for instance, by polymerizing the styrene, optionally butadiene, and optionally other monomers using free-radical emulsion polymerization. In some embodiments, the polymerization medium is an aqueous medium. Solvents other than water can be used in the emulsion. The emulsion polymerization can be carried out either as a batch, semi-batch, or continuous process. In some embodiments, a portion of the monomers can be heated to the polymerization temperature and partially polymerized, and the remainder of the polymerization batch can be subsequently fed to the polymerization zone continuously, in steps or with superposition of a concentration gradient. The process can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-19.

The polymer dispersion can be prepared by first charging a reactor with a seed latex, water, the monomers, and optionally at least one nonionic surfactant. The seed latex, although optional, helps initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature. The reaction temperature can be, for example, from 5° C. to 90° C. (e.g., from 40° C. to 90° C., from 50° C. to 85° C., or from 55° C. to 80° C.).

After the initial charge, the monomers that are to be used in the polymerization can be continuously fed to the reactor in one or more monomer feed streams. The monomers can be supplied as a pre-emulsion in an aqueous medium, particularly if acrylate monomers are used in the polymerization. An initiator feed stream can be also continuously added to the reactor at the time the monomer feed stream is added although it may also be desirable to include at least a portion of the initiator solution to the reactor before adding a monomer pre-emulsion if one is used in the process. The monomer and initiator feed streams are typically continuously added to the reactor over a predetermined period of time (e.g., 1.5-5 hours) to cause polymerization of the monomers and to thereby produce the polymer dispersion. A nonionic surfactant and any other surfactants can be added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

The monomers can be fed in one or more feed streams with each stream including one or more of the monomers being used in the polymerization process. For example, styrene and butadiene (when used) can be provided in separate monomer feed streams or can be added as a pre-emulsion. It can also be advantageous to delay the feed of certain monomers to provide certain polymer properties or to provide a layered or multiphase structure (e.g., a core/shell structure).

The molecular weight of the copolymers can be adjusted by adding a small amount of molecular weight regulators, for example, 0.01 to 4% by weight, based on the monomers being polymerized. Particular regulators which can be used include organic thio compounds (e.g., tert-dodecylmercaptan), allyl alcohols and aldehydes.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in *Progress in Polymer Science* 24, 1149-1204 (1999). Exemplary initiators include azo initiators and aqueous solutions of sodium persulfate. The initiator stream can optionally include one or more buffers or pH regulators.

In addition to the monomers and initiator, an anionic or nonionic surfactant (i.e., emulsifier) such as those described herein can be fed to the reactor. The surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor. The surfactant can be provided in an amount of 1%-5% by weight, based on the total weight of monomer and surfactant. In some embodiments, the surfactant is provided in an amount less than 2% by weight.

Once polymerization is completed, the polymer dispersion can be chemically stripped thereby decreasing its residual monomer content. This stripping process can include a chemical stripping step and/or a physical stripping step. In some embodiments, the polymer dispersion is chemically stripped by continuously adding an oxidant such as a peroxide (e.g., t-butylhydroperoxide) and a reducing agent (e.g., sodium acetone bisulfite), or another redox pair to the reactor at an elevated temperature and for a predetermined period of time (e.g., 0.5 hours). Suitable redox pairs are described by A. S. Sarac in *Progress in Polymer Science* 24, 1149-1204 (1999). An optional defoamer can also be added if needed before or during the stripping step. In a physical stripping step, a water or steam flush can be used to further eliminate the non-polymerized monomers in the dispersion. Once the stripping step is completed, the pH of the polymer dispersion can be adjusted and a biocide or other additives can be added. Cationic, anionic, and/or amphoteric surfactants or polyelectrolytes may optionally be added after the stripping step or at a later time if desired in the end product to provide a cationic or anionic polymer dispersion.

Once the polymerization reaction is complete, and the stripping step is completed, the temperature of the reactor can be reduced.

The compositions disclosed herein comprise an ionic crosslinking agent. In some embodiments, the polymer derived from styrene and optionally butadiene (e.g., a styrene-butadiene copolymer) provides sites for ionic crosslinking In some embodiments, the compositions disclosed herein comprise asphalt, and the asphalt provides sites for ionic crosslinking In some embodiments, the compositions disclosed herein comprise the polymer comprising styrene and optionally butadiene and asphalt, and the polymer and the asphalt can both provide sites for ionic crosslinking In some embodiments, the ionic crosslinking agent has a valency of at least 2, or at least 3 (e.g., 2, 3, 4, 5 or 6). In some embodiments, the ionic crosslinking agent is based on a metal cation. In some embodiments, the ionic crosslinking agent includes zirconium. In some embodiments, the ionic crosslinking agent includes ammonium zirconium carbonate. The zirconium compound can exist in aqueous and non-aqueous solvent solutions as a polymeric species. The chain length of the zirconium compound can be controlled via a number of factors such as the temperature, the pH, and the use of chelating agents to affect the crosslinking reaction. See Moles, Peter J.; Mel Chemicals; The Use of Zirconium in Surface Coatings. Data Sheet 117 (2002).

In some embodiments, the compositions disclosed herein comprise the ionic crosslinking agent and an additive that, without wishing to be bound to theory, is thought to induce or enhance crosslinking In some embodiments, the additive thought to induce or enhance crosslinking is a cationic additive thought to induce ionic crosslinking with the polymers disclosed herein. Exemplary cationic additives include, but are not limited to, ammonium zirconium carbonate, zirconium acetate, and amines such as diallyl dimethyl ammonium chloride. Crosslinking on the polymers disclosed herein is also thought to be induced or enhanced, for instance, by ionic moieties on the polymer particles. Exemplary ionic moieties include, but are not limited to, carboxylate, sulfonate, and phosphonate moieties.

Commercially available ionic crosslinking agents include, but are not limited to, BACOTE-20®, PROTEC® ZZA, and ZINPLEX-15®. The amount of the ionic crosslinking agent can be adjusted, for instance, based on the desired extent of the complexation of the acid groups on the polymer at a given pH. In some embodiments, the composition includes 0.01% to 5% by weight (e.g., 0.05%-4.5%, 1%-4%, 1.5%-3.5%, or 2%-3%) of the ionic crosslinking agent, based on the total weight of the solids (which can be roughly equivalent the weight of the polymer). In some embodiments, the composition comprises asphalt and does not comprise the copolymer; in those embodiments, the composition can include 0.01% to 10% by weight (e.g., 0.05%-9%, 1%-8%, 1.5%-6%, 2%-5%) of the ionic crosslinking agent, based on the total weight of the solids (i.e., the asphalt).

The ionic crosslinking can be conducted at any temperature. In some embodiments, the temperature is ambient temperature (i.e., 20° C-25° C.). In some embodiments, the temperature is 5° C. or greater (e.g., 10° C. or greater, 20° C. or greater, 30° C. or greater, 40° C. or greater, 50° C. or greater, 60° C. or greater, 70° C. or greater, 80° C. or greater, 90° C. or greater, 100° C. or greater, 110° C. or greater, 120° C. or greater, 130° C. or greater, 140° C. or greater, 150° C. or greater). In some embodiments, the temperature is 200° C. or less (e.g., 180° C. or less, 160° C. or less, 140° C. or less, 120° C. or less, 100° C. or less, 80° C. or less, 60° C. or less, 40° C. or less, or 20° C. or less). The crosslinking reaction can be carried out to different extents relative to its stoichiometry depending on, for instance, the amount of crosslinking agent present and/or the pH of the polymer. Because the ionic crosslinking can occur without the need for high activation temperatures to activate the crosslinking agent, the composition described herein can be used in a variety of applications.

In some embodiments, the polymer comprising styrene and optionally butadiene is in the form of a polymer dispersion having particles with an volume-average particle size from 20 nm to 500 nm (e.g., from 40 nm to 480 nm, from 60 nm to 460 nm, from 80 nm to 440 nm, from 100 nm to 420 nm, from 120 nm to 400 nm, from 140 nm to 380 nm, from 160 nm to 360 nm, from 180 nm to 340 nm, from 200 nm to 320 nm, or from 220 nm to 300 nm, or from 240 nm to 280 nm). In some embodiments, the polymer particles of the resultant polymer dispersion have a number average particle size of 20 nm to 300 nm (e.g., from 30 nm to 290 nm, from 40 nm to 280 nm, from 50 nm to 270 nm, from 60 nm to 260 nm, from 70 nm to 250 nm, from 80 nm to 240 nm, from 90 nm to 230 nm, from 100 nm to 220 nm, from 110 nm to 210 nm, from 120 nm to 200 nm, from 130 nm to 190 nm, or from 140 nm to 180 nm). The particle size measurements are made using dynamic light scattering measurements using the Nicomp Model 380 available from Particle Sizing Systems, Santa Barbara, Calif. The polymer dispersion can be produced as a dispersion that includes, as a disperse phase, particles of the copolymer dispersed in water. The polymer dispersion can be prepared with a total solids content of from 5% to 90% by weight (e.g., 10% to 80% by weight, 20% to 70% by weight, 25% to 65% by weight, 35% to 60% by weight, or 45% to 55% by weight). In some embodiments, the polymer dispersion can have a total solids content of 50% or greater by weight (e.g., from 50% or greater by weight to 90% or less by weight). In some embodiments, the copolymer dispersion can be spray dried to produce a powder.

The composition can include one or more surfactants (emulsifiers) such as nonionic surfactants, anionic surfactants, cationic surfactants, amphoteric surfactants, or a mixture thereof. Suitable nonionic surfactants include, but are not limited to, polyoxyalkylene alkyl ethers and polyoxyalkylene alkylphenyl ethers (e.g., diethylene glycol monoethyl ether, diethylene glycol diethyl ether, polyoxyethylene lauryl ether, polyoxyethylene stearyl ether, and polyoxyethylene nonylphenyl ether); oxyethylene-oxypropylene block copolymers; sorbitan fatty acid esters (e.g., sorbitan monolaurate available as SPAN® 20 from Merck Schuchardt OHG, sorbitan monooleate available as SPAN® 80 from Merck Schuchardt OHG, and sorbitan trioleate available as SPAN® 85 from Merck Schuchardt OHG); polyoxyethylene sorbitan fatty acid esters (e.g., polyoxyethylene sorbitan monolaurate available as TWEEN® 20 and TWEEN® 21 from Uniqema, polyoxyethylene sorbitan monopalmitate available as TWEEN® 40 from Uniqema, polyoxyethylene sorbitan monostearate available as TWEEN® 60, TWEEN® 60K, and TWEEN® 61 from Uniqema, polyoxyethylene sorbitan monooleate available as TWEEN® 80, TWEEN® 80K, and TWEEN® 81 from Uniqema, and polyoxyethylene sorbitan trioleate available as TWEEN® 85 from Uniqema); polyoxyethylene sorbitol fatty acid esters (e.g., tetraoleic acid polyoxyethylene sorbitol); glycerin fatty acid esters (e.g., glycerol monooleate); polyoxyethylene glycerin fatty acid esters (e.g., monostearic acid polyoxyethylene glycerin and monooleic acid polyoxyethylene glycerin); polyoxyethylene fatty acid esters (e.g., polyethylene glycol monolaurate and polyethylene glycol monooleate); polyoxyethylene alkylamine; and acetylene glycols. In some embodiments, the nonionic surfactant can have a HLB (hydrophilic lipophilic balance) at room temperature such that 8<HLB<15. In some embodiments, the HLB is 14 or less. In some embodiments, the nonionic surfactant includes an ethylene oxide $(EO)_m$ and/or propylene oxide $(PO)_n$ adduct of an alkyl, alkylbenzene or dialkylbenzene alcohol wherein $(m+n) \geq 14$, $(m+n) \geq 12$, or $(m+n) \geq 10$ (e.g., $6 \geq (m+n) \geq 10$), such as those available from BASF under the LUTENSOL™ trademark.

Suitable anionic emulsifiers include, but are not limited to, fatty acids, alkyl sulfates, alkyl ether sulfates, alkyl benzene sulfonic acid, alkyl phosphoric acid or salts thereof, sucrose esters, and mixtures thereof. Anionic polyelectrolytes such as tartrates, borates, oxalates and phosphates, can also be used in the composition. Additional suitable anionic surfactants and polyelectrolytes include, but are not limited to, M28B and other anionic surfactants available from MeadWestvaco under the INDULIN® trademark (such as INDULIN® AMS, INDULIN® SA-L, INDULIN® ISE, INDULIN® 201, INDULIN® 202, and INDULIN® 206); anionic surfactants available from Akzo Nobel under the REDICOTE® trademark (such as REDICOTE® E-15 and REDICOTE® E-62C); and lignosulfonates such as those available under the MARASPERSE™ trademark (such as MARASPERSE™ CBOS-3 and MARASPERSE™ N22). In some embodiments, the emulsifier includes an anionic fatty acid-based emulsifier.

Cationic emulsifiers can be classified as cationic rapid setting (CRS), cationic quick setting (CQS), cationic medium setting (CMS), or cationic slow setting (CSS) emulsifiers and these classifications are known in the art and can be readily measured in an emulsion as set forth in ASTM D977 and D2397. In some embodiments, cationic polyelectrolytes can be provided in the composition. Suitable cationic emulsifiers and polyelectrolytes include alkylamine salts, quaternary ammonium salts, cationic surfactants available from Akzo Nobel under the REDICOTE® trademark (such as REDICOTE® 4819, REDICOTE® E-64R, REDICOTE® E-5, REDICOTE® E-9, REDICOTE® E9A, REDICOTE® E-11, REDICOTE® E-16, REDICOTE® E-44, REDICOTE® E-120, REDICOTE® E-250, REDICOTE® E-2199, REDICOTE® E-4868, REDICOTE® C-346, REDICOTE® C-404, REDICOTE® C-450, and REDICOTE® C-471), cationic surfactants available from MeadWestvaco under the INDULIN® and AROSURF® trademarks (such as INDULIN® 814, INDULIN® AMS, INDULIN® DF-30, INDULIN® DF-40, INDULIN® DF-42, INDULIN® DF-60, INDULIN® DF-80, INDULIN® EX, INDULIN® FRC, INDULIN® MQK, INDU- LIN® MQK-1M, INDULIN® MQ3, INDULIN® QTS, INDULIN® R-20, INDULIN® SBT, INDULIN® W-1, and INDULIN® W-5), ASFIER® N480 available from Kao Specialties Americas, CYPRO™ 514 available from Cytec Industries, polyethyleneimines such as those available from BASF under the POLYMIN® trademark (such as POLYMIN® SK, POLYMIN® SKA, POLYMIN® 131, POLYMIN® 151, POLYMIN® 8209, POLYMIN® P, and POLYMIN® PL), and polyvinylamines such as those available from BASF under the CATIOFAST® trademark (such as CATIOFAST® CS, CATIOFAST® FP, CATIOFAST® GM, and CATIOFAST® PL). Other suitable cationic polyelectrolytes and surfactants include those listed in, for instance, U.S. Patent Nos. 5,096,495, 5,160,453, and 5,443,632. In some embodiments, the cationic emulsifier includes an amine-based emulsifier.

Suitable amphoteric surfactants include, but are not limited to, betaine acetate, amide betaine, sulfobetaine, imidazolium betaine, and amine oxides. An exemplary amphoteric surfactant is REDICOTE® E-7000 surfactant, which is available from Akzo Nobel.

Because the ionic crosslinking can occur without the need for high activation temperatures to activate the crosslinking agent, the composition described herein can be used in formulations for a variety of applications. For instance, the compositions disclosed herein can also be used in any application wherein conventional polystyrene homopolymers or styrene-butadiene copolymers can be used. Exemplary applications that can include the compositions disclosed herein include, but are not limited to, asphalt compositions, paints, coatings, paper binding and coating compositions (e.g., paper saturation), foams, carpet compositions, or adhesives.

For applications where an ingredient of the application's formulation provides sites for ionic crosslinking (such as asphalt applications, wherein the asphalt itself provides anionic moieties for crosslinking), the addition of a polystyrene homopolymer or a styrene-butadiene copolymer is optional. In some embodiments for asphalt applications (e.g., asphalt emulsions, hot-mix asphalt, warm-mix asphalt, etc.), the composition comprises the ionic crosslinking agent blended with the asphalt, without the addition of the polymer in any step.

In some embodiments for asphalt applications, the composition comprises the asphalt, the ionic crosslinking agent, and the polymer derived from styrene and optionally butadiene and the asphalt and the polymer can both provide sites for ionic crosslinking In those embodiments, the asphalt, ionic crosslinking agent, and the polymer can be blended together in any order. For instance, the asphalt and ionic crosslinking agent can be blended together, and then later blended with the polymer. Or, the asphalt and polymer can be blended together, and then later blended with the ionic crosslinking agent. Or, the polymer and the ionic crosslinking agent can be blended together, and then later blended with the asphalt. The asphalt, ionic crosslinking agent, and optional polymer can be blended at any temperature. In some embodiments, the polymer, ionic crosslinking agent, and asphalt (for instance, in pulverized, powder, or emulsion form) can be blended at ambient temperature and then heated. In some embodiments, the polymer, ionic crosslinking agent, and asphalt can be at different temperatures when blended (e.g., the polymer and ionic crosslinking agent can be at ambient temperature and the asphalt can be at a temperature above ambient temperature).

In applications where no ingredients in the formulation for the desired application provide sites for ionic crosslinking (e.g., for certain applications of paint, paper formulation, carpet, or adhesive formulation, etc.), the polymer can be added to the formulation for the application to provide sites for ionic crosslinking In those embodiments, the polymer, the ionic crosslinking agent, and the formulation for the desired application (e.g., paint, paper formulation, carpet, adhesive formulation, etc.) can be blended in any order. For instance, the formulation for the desired application (e.g., paint, paper formulation, carpet, adhesive formulation, etc.) and ionic crosslinking agent can be blended together, and then later blended with the polymer. Or, the formulation for the desired application (e.g., paint, paper formulation, carpet, adhesive formulation, etc.) and polymer can be blended together, and then later blended with the ionic crosslinking agent. Or, the polymer and the ionic crosslinking agent can be blended together, and then later blended with the formulation for the desired application (e.g., paint, paper formulation, carpet, adhesive formulation, etc.). The polymer, ionic crosslinking agent, and formulation for the desired application (e.g., paint, paper formulation, carpet, adhesive formulation, etc.) can be blended at any temperature. In some embodiments, the polymer, ionic crosslinking agent, and formulation for the desired application (e.g., paint, paper formulation, carpet, adhesive formulation, etc.) can be blended at ambient temperature and then heated. In some embodiments, the polymer, ionic crosslinking agent, and formulation for the desired application (e.g., paint, paper formulation, carpet, adhesive formulation, etc.) can be at different temperatures when blended (e.g., the polymer and ionic crosslinking agent can be at ambient temperature and the formulation can be at a temperature above ambient temperature).

Some formulations for applications disclosed herein comprise a solvent such as water to disperse or emulsify the polymer and/or the asphalt. Some compositions disclosed herein comprise water. In some embodiments, the composition comprises asphalt and the asphalt comprises water and is an aqueous emulsion. In some embodiments, the composition comprises the polymer and the polymer comprises water and is an aqueous dispersion. In some embodiments, the asphalt and/or the polymer comprise water, and one or both are an aqueous dispersion or emulsion. Some formulations of the applications disclosed herein do not comprise water but include a non-aqueous solvent. Some compositions disclosed herein do not comprise water. In some embodiments, the polymer and/or asphalt may be in the form of a non-aqueous dispersion or emulsion.

Without wishing to be bound to theory, the ionic crosslinking is believed to occur once the water or non-aqueous solvent (if either is used) is substantially evaporated or removed from the composition. The evaporation or removal of water or non-aqueous solvent from the compositions disclosed herein can be done in any method known in the art. In embodiments wherein the composition does not comprise water or non-aqueous solvent, crosslinking can begin upon mixing the ionic crosslinking agent with a component capable of providing crosslinking sites (such as, for instance, asphalt or the polymer comprising styrene and optionally butadiene). In some embodiments, the polymer and the ionic crosslinking agent are blended and undergo ionic crosslinking in the substantial absence of water or non-aqueous solvent (such as during spray drying of a latex polymer containing the ionic crosslinking agent) to provide a crosslinked product, and the crosslinked product is then added to a formulation of the desired application (e.g., paint, carpet, asphalt, or asphalt emulsion, etc.), which may or may not include water or non-aqueous solvent. If the crosslinked product is formed before it is added to the formulation for the desired application, any water or non-aqueous solvent present in the formulation for the desired application need not be evaporated. In some embodiments, the composition comprises the polymer comprising water or non-aqueous solvent blended with the ionic crosslinking agent (and optionally a formulation of the desired application (e.g., paint, asphalt, carpet), which may or may not also include water), and the water or non-aqueous solvent is substantially evaporated from the composition such that ionic crosslinking occurs, and the crosslinked product forms once the composition is substantially free of water or non-aqueous solvent. In some embodiments, asphalt in the substantial absence of water or non-aqueous solvent is blended with the ionic crosslinking agent, and ionic crosslinking occurs in the asphalt. In some embodiments, the asphalt is provided as an aqueous emulsion, the asphalt is blended with the ionic crosslinking agent, and the water is substantially evaporated from the composition such that ionic crosslinking occurs.

In some embodiments, the ionic crosslinking agent is included in an asphalt composition. In some embodiments, the ionic crosslinking agent and the polymer derived from styrene and optionally butadiene is included in an asphalt composition. The asphalt composition can further include one or more additives. Suitable additives include inorganic salts, thickeners, and fillers. Inorganic salts can be added, for example to improve emulsifiability, in an amount of up to 1 part by weight. Suitable inorganic salts include, but are not limited to, sodium chloride, potassium chloride, calcium chloride, aluminum chloride and mixtures thereof. Thickeners can be added in an amount of 0.5 parts by weight or greater and can include associative thickeners, polyurethanes, alkali swellable latex thickeners, cellulose, cellulose derivatives, modified cellulose products, plant and vegetable gums, starches, alkyl amines, polyacrylic resins, carboxyvinyl resins, polyethylene maleic anhydrides, polysaccharides, acrylic copolymers, hydrated lime (such as cationic and/or nonionic lime), or mixtures thereof. Mineral fillers and/or pigments can include, but are not limited to, calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides (e.g., titanium dioxide), aluminum hydroxide, aluminum trihydrate, satine white, magnesium oxide, and mixtures thereof. Fillers such as mineral fillers and carbon black can be included in an amount of up to 5 parts by weight or up to 2 parts by weight. For example, the filler can be provided in an amount of 0.1 part by weight or greater or 0.5 parts by weight or greater. The carbon black can be used to blacken the composition as is desired, for example, in fog seal applications. The mineral filler can be provided as a fine powder and can be used, for example, to increase the set rate of the asphalt emulsion or to reduce or prevent bleeding of the asphalt. Suitable mineral fillers include hydrated lime, limestone dust, Portland cement, silica, alum, fly ash, and combinations thereof. Mineral filler generally refers to a finely divided mineral product wherein at least 65 percent of which will pass through a No. 200 sieve, and typically has an average size that is less than 0.003 inches.

The composition can also include aggregate. The aggregate can be of varying sizes as would be understood by those of skill in the art. Any aggregate that is traditionally employed in the production of bituminous paving compositions can be used, including dense-graded aggregate, gap-graded aggregate, open-graded aggregate, reclaimed asphalt pavement, and mixtures thereof. Dense-graded aggregate exhibits the greatest mineral surface area (per unit of aggregate). Open-graded aggregate largely consist of a single, large-sized (e.g., around 0.375 inch to 1.0 inch) stone with very low levels (e.g., less than about two percent of the total aggregate) of fines (e.g., material less than 0.25 inch) or filler (e.g., mineral material less than 0.075 mm). Gap graded aggregate fall between dense-graded and open-graded classes. Reclaimed asphalt pavement (RAP) material generally reflects the gradation of the pavement from which the reclaimed material was obtained. If the original pavement was a dense-graded mix, the RAP will also be dense graded, although the filler content is generally observed to be lower than the design limits of the origin aggregate specifications. The aggregate can be applied in an amount of from 100 parts by weight to 2000 parts by weight.

Compositions that include aggregate can also include air voids in some embodiments. The air voids can be present in an amount of from 2% to 30% by volume (e.g., greater than 2% to 10% by volume).

An asphalt composition can be prepared by mixing asphalt, any aromatic recycling agents or non-asphaltic rosin materials, the ionic crosslinking agent, an emulsifier, an acid or base, water and any additives, and optionally a polymer derived from styrene and optionally butadiene. In some embodiments, the polymer is not crosslinked by an ionic crosslinking agent, and can be added separately from an ionic crosslinking agent into the asphalt composition and the polymer and the asphalt can be crosslinked by the ionic crosslinking agent in the asphalt composition once the water is substantially evaporated. For example, an asphalt composition can include the ionic crosslinking agent and further components can be added to or included in that composition. For example, the asphalt composition can be an emulsion comprising the asphalt and the ionic crosslinking agent. In some embodiments, a composition comprising asphalt and an ionic crosslinking agent can be provided, the polymer (e.g., as an aqueous dispersion) can be mixed with the composition, and the polymer and asphalt can be crosslinked with the ionic crosslinking agent resulting in an asphalt-based composition comprising a crosslinked polymer once the water is substantially evaporated.

The particular components can be mixed together by means known in the art. As previously mentioned, the particular components can be mixed together in any order. In some embodiments, the polymer derived from styrene and optionally butadiene is pre-mixed with an anionic emulsifier or a cationic emulsifier to produce a charged polymer before mixing the asphalt and the acid or base with the emulsifier and the polymer. If aggregate is blended into the asphalt composition, it can be added, for example, after the other components are blended. In some embodiments, the asphalt composition is prepared at an elevated temperature, for example, from 160° C. to 200° C. (hot-mix asphalt), from 120° C. to 160° C. (warm-mix asphalt), or at temperatures below 120° C. (e.g., from 5° C. to 60° C. or from 5° C. to 90° C.). In some embodiments, the asphalt composition can be prepared at ambient temperature.

The asphalt composition can be applied for use in a pavement or paved surface. A pavement surface or a paved surface is a hard surface that can bear pedestrian or vehicular travel can include surfaces such as motorways/roads, parking lots, bridges/overpasses, runways, driveways, vehicular paths, running paths, walkways, and the like. The asphalt composition can be applied directly to an existing paved surface or can be applied to an unpaved surface. In some embodiments, the composition is applied to an existing paved layer as a tie layer, and a new layer comprising asphalt such as a hot mix layer is applied to the tie layer. The asphalt composition can be applied to a surface "cold," i.e., at a temperature below 40° C., or can be applied to at an elevated temperature, for example, from 50° C. to 120° C., from 55° C. to 100° C., or from 60° C. to 80° C.

In some embodiments, aggregate is blended into the asphalt composition before application to a surface. In some embodiments, aggregate is applied to the composition after it is applied to a surface. In some embodiments, sand can be applied to the composition after it is applied to a surface, for example, if the composition is to be used as a tack coat, to reduce the tackiness of the surface. The composition and optionally the aggregate can be compacted after application to the surface as would be understood by those of skill in the art.

In some embodiments, the composition is used as a tack coat or coating. The tack coat is a very light spray application of diluted asphalt emulsion that can be used to promote a bond between an existing surface and the new asphalt application. The tack coat acts to provide a degree of adhesion or bonding between asphalt layers, and in some instances, can fuse the layers together. The tack coat also acts to reduce slippage and sliding of the layers relative to other layers in the pavement structure during use or due to wear and weathering of the pavement structure. As described above, the composition can be applied to an existing paved layer (such as a hot-mix layer) as a tie layer as a tack coat, and a new layer comprising asphalt such as a hot-mix layer can be applied to the tack coat. As would be understood by those skilled in the art, the tack coat typically does not include aggregate, although sand may be applied to the tack coat after application as mentioned above. The composition described herein has unexpectedly been found to be a low-tracking or "trackless" coating such that, after the tack coating is cured, paving vehicles or other traffic may be permitted to pass over the coating such that the vehicle tires or treads stick to the coating a limited amount (low track) or not at all (trackless). The composition described herein has unexpectedly been found to be low-tracking or "trackless," for example, at higher pavement temperatures (50° C-60° C.) and/or with low or medium pen asphalts having a pen value of greater than 40 dmm. The tack coat is tacky and capable of bonding together layers of a pavement structure at ambient conditions for pavement construction or at elevated temperatures, e.g., up to 140° C. as discussed above. In fact, the tack coat provides a sufficiently flexible asphalt at low temperatures with sufficient bond strength to bond adjacent asphalt layers. The tack coat cures quickly such that the pavement layer may be applied to the coating, hours to days after the emulsion is applied to the substrate. The applied composition can cure in 15 minutes to 45 minutes, and may cure as rapidly as 5 minutes to 15 minutes after the composition is applied to the exposed surface. The cure rate will depend on the application rate, the dilution ratios used, the base course conditions, the weather, and other similar considerations. If the prepared pavement surface or base course contains excess moisture, the curing time of the emulsion may be increased.

In some embodiments, the composition can also be used as a fog seal. A fog seal is a surface treatment that applies a light application of the composition to an existing paved surface such as a parking lot to provide an enriched pavement surface that looks fresh and black. In some embodiments, the fog seal would include a filler such as carbon black to blacken the composition. As would be understood by those skilled in the art, the fog seal might not include aggregate. The fog seal compositions, like the bond coat compositions, have also been shown to be to be low-tracking or "trackless" coatings.

In some embodiments for the tack coat and fog seal, the asphalt can be present in an amount of from 58 to 62 parts by weight, the polymer comprising styrene and optionally butadiene can be present in an amount of from 0 to 6 parts by weight, the emulsifier can be present in an amount of from 0.75 to 3 parts by weight, the acid or base can be present in an amount of from 0.75 to 3 parts by weight, any optional additives be provided in an amount of up to 5 parts by weight, and water can be present in an amount of from 30 to 40 parts by weight. In some embodiments, the composition can be further diluted with water. The composition can be applied at a rate of 0.05-0.10 gallons/yd$^2$.

In some embodiments, the composition can be used as a chip seal composition. Chip seals are the most common surface treatment for low-volume roads. The chip seal composition can be applied to a surface followed by the application of aggregate. In some embodiments for the chip seal, the asphalt can be present in an amount of from 64 to 67 parts by weight, the polymer comprising styrene and optionally butadiene can be present in an amount of from 0 to 3.5 parts by weight, the emulsifier can be present in an amount of from 0.15 to 0.35 parts by weight, the acid or base can be present in an amount of from 0.15 to 0.35 parts by weight, any optional additives be provided in an amount of up to 5 parts by weight, and water can be present in an amount of from 30 to 40 parts by weight. The aggregate can be provided in an amount of from 200 to 1000 parts by weight.

In some embodiments, the composition can be used as a microsurfacing application. Microsurfacing is designed for quick traffic return with the capacity of handling high traffic volume roadways. For the microsurfacing composition, aggregate can be mixed in with the asphalt, optionally a polymer comprising styrene and optionally butadiene, emulsifier and acid or base before application to a surface. In some embodiments for the microsurfacing, the asphalt can be present in an amount of from 60 to 62 parts by weight, the polymer comprising styrene and optionally butadiene can be present in an amount of from 0 to 4.5 parts by weight, the emulsifier can be present in an amount of from 0.5 to 2.5 parts by weight, the acid or base can be present in an amount of from 0.5 to 2.5 parts by weight, any optional additives be provided in an amount of up to 5 parts by weight (e.g., 0.25 to 2 parts by weight of one or more inorganic salts or up to 5 parts by weight of a mineral filler), and water can be present in an amount of from 30 to 40 parts by weight. The aggregate can be provided in an amount of from 500 to 2000 parts by weight.

The resulting paved surface layer using the composition, once dried, includes the components provided in the composition with the exception of water. Thus, the paved surface layer can include asphalt in an amount of from 40 to 70 parts by weight, a polymer comprising styrene and optionally butadiene in an amount of from 0 to 10 parts by weight, an emulsifier in an amount of from 0.1 to 4 parts by weight, and an acid or base in an amount of from 0.1 to 4 parts by weight. In the case of a tack coat, the paved surface can include a first layer comprising asphalt; a tie layer provided on the first layer, comprising asphalt in an amount of from 40 to 70 parts by weight, the polymer comprising styrene and optionally butadiene in an amount of from 0 to 10 parts by weight, an emulsifier in an amount of from 0.1 to 4 parts by weight, and an acid or base in an amount of from 0.1 to 4 parts by weight; and a second layer comprising asphalt provided on the tie layer.

Although parts by weight are used for the compositions described herein, percentages by weight could be used interchangeability with the parts by weight, for example, where the composition includes the asphalt, the optional polymer comprising styrene and optionally butadiene, the emulsifier, the acid or base, the water, and any additives excluding aggregate. For example, the composition can be described to include (a) asphalt in an amount of from 40 to 70 percent by weight; (b) a polymer comprising styrene and optionally butadiene in an amount of from 0 to 10 percent by weight; (c) an emulsifier in an amount of from 0.1 to 4 percent by weight; (d) an acid or a base in an amount of from 0.1 to 4 percent by weight; and (e) water in an amount of from 25 to 60 percent by weight.

Because the compositions described herein can be produced without the need for high activation temperatures, the compositions can be used in a variety of applications (e.g., warm-mix asphalt applications occurring at 120° C-140° C.) to provide adequate crosslinking at a variety of temperatures. For example, the composition can be blended with the asphalt composition at a temperature of 160° C. or less, 140° C. or less, or 120° C. or less. The compositions and methods disclosed herein can also provide greater control of, for instance, polymer-modified asphalt, depending on the extent of the network formed by the crosslinking reaction between the polymer and/or asphalt and the crosslinking agent. Further, the compositions and methods disclosed herein do not require the use of sulfur and as a result, hydrogen sulfide ($H_2S$) emissions can be reduced. For example, in some embodiments, the asphalt composition is substantially free of sulfur or sulfur-based crosslinking agents. In other words, the asphalt composition can be produced without the use of sulfur-based crosslinking agents.

The asphalt compositions disclosed herein may have a smooth texture compared to the grainy texture of, for instance, sulfur-crosslinked styrene-butadiene rubber asphalts. Additionally, the asphalt compositions disclosed herein can have a performance grade (PG) increase of at least 1 PG or at least 2 PG above that of a non-crosslinked asphalt. The improvement can be a 1 PG or more improvement in the Strategic Highway Research Program (SHRP) fresh high temperature, the Rolling Thin-Film Oven (RTFO) SHRP high temperature, or both. A standard NUSTAR 64-22 asphalt without the polymer has an SHRP High Temperature of 64° C. Performance Grade improvements are measured in increments of 6° C. Accordingly, a polymer-modified NUSTAR 64-22 having an SHRP High Temperature of 70° C. would be 1 PG improvement over the comparative, standard NUSTAR 64-22 without the polymer. Similarly, a polymer-modified NUSTAR 64-22 having an SHRP High Temperature of 76° C. would be 2 PG improvements over the comparative, standard NUSTAR 64-22 without the polymer.

In some embodiments, the compositions disclosed herein can be used in paints, coatings, paper coating or binding compositions, carpet compositions (e.g., carpet backing), foams, or adhesives. In some embodiments, one or more thickeners (rheology modifiers) can be added to increase the viscosity of the composition. Suitable thickeners can include, but are not limited to, acrylic copolymer dispersions sold under the STEROCOLL and LATEKOLL trademarks from BASF Corporation, Florham Park, N.J., hydroxyethyl cellulose, guar gum, jaguar, carrageenan, xanthan, acetan, konjac, mannan, xyloglucan, urethanes and mixtures thereof. The thickeners can be added to the composition formulation as an aqueous dispersion or emulsion, or as a solid powder.

The composition described herein can include, for instance, additives such as dispersants, initiators, stabilizers, chain transfer agents, buffering agents, salts, preservatives, fire retardants, wetting agents, protective colloids, biocides, corrosion inhibitors, crosslinking promoters, and lubricants. Exemplary dispersants can include sodium polyacrylates in aqueous solution such as those sold under the DARVAN trademark by R.T. Vanderbilt Co., Norwalk, CT.

Paint and coating compositions can, for instance, include one or more pigments or dyes. Exemplary composition pigments include titanium dioxide composition pigments, MIRAGLOSS 91 (a kaolin clay composition pigment commercially available from BASF Corporation), LOPAQUE M (a kaolin clay composition pigment commercially available from Thiele Kaolin Company), and HYDROCARB 90 (a calcium carbonate composition pigment commercially available from Omya Paper). In some embodiments, the composition can include one or more dyes or colored pigments. Exemplary dyes can include basic dyes, acid dyes, anionic direct dyes, and cationic direct dyes. Exemplary colored pigments include organic pigments and inorganic pigments in the form of anionic pigment dispersions and cationic pigment dispersions.

By way of non-limiting illustration, examples of certain embodiments of the present disclosure are given below.

EXAMPLES

Example A

Non-Carboxylated Styrene-Butadiene Latex Preparation

A non-carboxylated styrene-butadiene latex (denoted as SB in the table below) was prepared as follows. A copolymer derived from 50 parts by weight styrene and 50 parts by weight butadiene was produced. A styrene feed, a butadiene feed, an initiator feed comprising an aqueous solution of sodium persulfate initiator (0.36 parts by weight of the total monomers) and tert-dodecylmercaptan (0.2 parts by weight of the total monomers) were added over 6 hours to a pre-heated reactor (75° C.) containing water, sodium hydroxide (0.14 parts by weight of the total monomers), a polystyrene seed latex (1.67 parts by weight of the total monomers), and TRILON BX (0.03 parts by weight of the total monomers), an ethylenediaminetetraacetic acid commercially available from BASF Corporation (Florham Park, N.J.). The stabilization of the latex particles during polymerization was accomplished by feeding an aqueous solution of potassium oleate surfactant (3.6 parts by weight of the total monomers) over the course of the polymerization. The temperature was maintained at 75° C. throughout the polymerization reaction. Following the polymerization process, the latex dispersion was stripped of the residual monomers to provide an aqueous dispersion with residual styrene levels of less than 400 ppm.

Example B

Carboxylated Styrene-Butadiene Latex Preparation

A carboxylated styrene-butadiene latex (denoted as XSB in the table below) was prepared using a similar procedure as described in Example A, except that 0.54 parts itaconic acid was added in the initial reactor charge and no sodium hydroxide was used. Styrene (41.3 parts by weight of the total monomers), butadiene (56.0 parts by weight of the total monomers), itaconic acid (2.16 parts by weight of the total monomers), CALFOAM® ES-303, an anionic surfactant, (various amounts), and t-dodecyl mercaptan (various amounts) were fed over 4.5 hours to the reactor at 85° C. The initiator, sodium persulfate (0.95 parts by weight of the total monomers), was fed to the reactor over 5.75 hours. Different variations of this procedure with respect to temperature, t-dodecyl mercaptan level, and functional monomers were made to produce the carboxylated-styrene butadiene latexes described herein, as shown below.

Sixteen copolymer dispersions of Example A or Example B were prepared and analyzed. Table 1 below shows the composition of the ten examples and six comparative examples.

Comparative Example CE1 and Examples 1-3 were prepared using 1.1 parts tert-dodecylmercaptan per hundred parts total monomer, 3.6 parts CALFOAM® ES-303 per parts total monomer, 2.7 parts itaconic acid per hundred parts total monomer, 0.95 parts sodium persulfate per hundred parts total monomer, 41.3 parts styrene per hundred parts total monomer, 56 parts butadiene per hundred parts total monomer, and no N-methylolacrylamide.

Example 4 was prepared using 0.45 parts tert-dodecylmercaptan per hundred parts total monomer, 0.5 parts CALFOAM® ES-303 per parts total monomer, 1.98 parts itaconic acid per hundred parts total monomer, 0.95 parts sodium persulfate per hundred parts total monomer, 42 parts styrene per hundred parts total monomer, 56 parts butadiene per hundred parts total monomer, and no N-methylolacrylamide. Comparative Example CE2 and Example 5 were prepared using 1.1 parts tert-dodecylmercaptan per hundred parts total monomer, 3.6 parts CALFOAM® ES-303 per parts total monomer, 2.7 parts itaconic acid per hundred parts total monomer, 0.95 parts sodium persulfate per hundred parts total monomer, 42.42 parts styrene per hundred parts total monomer, 54.5 parts butadiene per hundred parts total monomer, and 0.375 parts N-methylolacrylamide per hundred parts total monomer.

Comparative Example CE3 and Example 6 were prepared using 1.1 parts tert-dodecylmercaptan per hundred parts total monomer, 3.6 parts CALFOAM® ES-303 per parts total monomer, 2.7 parts itaconic acid per hundred parts total monomer, 0.95 parts sodium persulfate per hundred parts total monomer, 38.8 parts styrene per hundred parts total monomer, 58.5 parts butadiene per hundred parts total monomer, and no N-methylolacrylamide.

Comparative Example CE4 and Examples 7-9 were prepared using 1.8 parts tert-dodecylmercaptan per hundred parts total monomer, 3.6 parts CALFOAM® ES-303 per parts total monomer, 2.7 parts itaconic acid per hundred parts total monomer, 0.95 parts sodium persulfate per hundred parts total monomer, 42.42 parts styrene per hundred parts total monomer, 54.5 parts butadiene per hundred parts total monomer, and 0.375 parts N-methylolacrylamide per hundred parts total monomer.

Comparative Examples CE5 and CE5 and Example 10 are non-carboxylated styrene-butadiene latexes prepared as described in Example A above.

TABLE 1

| Sample | Copolymer Type | Asphalt | Crosslinker Type | Crosslinker Amount (wt %) |
|---|---|---|---|---|
| CE1 | XSB | NuStar 64-22 | Sulfur-Based | 4.2% |
| CE2 | XSB | NuStar 64-22 | Sulfur-Based | 4.2% |
| CE3 | XSB | NuStar 64-22 | Sulfur-Based | 4.2% |
| CE4 | XSB | NuStar 64-22 | Sulfur-Based | 4.2% |
| CE5 | SB | NuStar 64-22 | None | N/A |
| CE6 | SB | NuStar 64-22 | Sulfur-Based | 2.1% |
| 1 | XSB | NuStar 64-22 | Bacote-20 | 0.05% |
| 2 | XSB | NuStar 64-22 | Bacote-20 | 0.25% |
| 3 | XSB | NuStar 64-22 | Bacote-20 | 0.5% |
| 4 | XSB | NuStar 64-22 | Bacote-20 | 3% |
| 5 | XSB | NuStar 64-22 | Bacote-20 | 3% |
| 6 | XSB | NuStar 64-22 | Bacote-20 | 3% |
| 7 | XSB | NuStar 64-22 | Bacote-20 | 0.2% |
| 8 | XSB | NuStar 64-22 | Bacote-20 | 1% |
| 9 | XSB | NuStar 64-22 | Bacote-20 | 2% |
| 10 | SB | NuStar 64-22 | Bacote-20 | 2% |

Comparative Examples CE1-CE4 comprise carboxylated styrene-butadiene copolymer dispersions containing 4.2% of a sulfur-based crosslinking agent, based on the total weight of the copolymer, prepared by post-adding the sulfur-based crosslinking agent to the dispersion. Asphalt compositions were then prepared using 3 wt % of the carboxylated styrene-butadiene copolymer dispersion containing the sulfur-based crosslinking agent by the method disclosed below, wherein NUSTAR 64-22 was used as the asphalt cement.

Comparative Example CE5 comprises a noncarboxylated styrene-butadiene copolymer dispersion that was not crosslinked. An asphalt composition was then prepared using 3 wt % of the non-crosslinked, noncarboxylated styrene-butadiene composition by the method disclosed below, wherein NUSTAR 64-22 was used as the asphalt cement.

Comparative Example CE6 comprise noncarboxylated styrene-butadiene copolymer dispersions containing 2.1% of a sulfur-based crosslinking agent, based on the total weight of the copolymer, prepared by post-adding the sulfur-based crosslinking agent to the dispersion. Asphalt compositions were then prepared using 3 wt % of the carboxylated styrene-butadiene copolymer dispersion containing the sulfur-based crosslinking agent by the method disclosed below, wherein NUSTAR 64-22 was used as the asphalt cement.

Examples 1-9 comprise carboxylated styrene-butadiene copolymer dispersions to which various amounts (e.g., 0.05%, 0.2%, 0.25%, 0.5%, 1%, 2%, 3%), by weight, of BACOTE-20 (an ammonium zirconium carbonate crosslinking agent) as the ionic crosslinking agent, based on the total weight of the copolymer, were post-added to the dispersion. Asphalt compositions were then prepared using 3 wt % of the carboxylated styrene-butadiene copolymer dispersion containing the ionic crosslinking agent by the method disclosed below, wherein NUSTAR 64-22 was used as the asphalt cement. Once the water in the composition substantially evaporated (as a function of the time and temperature of the asphalt emulsion, for instance), ionic crosslinking occurred, forming an ionically crosslinked product.

Example 10 comprises a noncarboxylated styrene-butadiene copolymer dispersion to which 2%, by weight, of BACOTE-20 (an ammonium zirconium carbonate crosslinking agent) as the ionic crosslinking agent, based on the total weight of the copolymer, was post-added to the dispersion. Asphalt compositions were then prepared using 3 wt % of the non-carboxylated styrene-butadiene copolymer dispersion containing the ionic crosslinking agent by the method disclosed below, wherein NUSTAR 64-22 was used as the asphalt cement. Once the water in the composition substantially evaporated (as a function of the time and temperature of the asphalt emulsion, for instance), ionic crosslinking occurred, forming an ionically crosslinked product.

The resulting asphalt compositions prepared from the sixteen compositions described above (Comparative Examples CE1-CE6 and Examples 1-10) were then tested for at least one of the following properties: elastic recovery, asphalt viscosity, SHRP (Fresh and RTFO), ER texture, and mixing texture. The procedures for conducting those tests and results of those tests are discussed below.

Latex Polymer-Modified Asphalt Sample Preparation

Asphalt cement was preheated to 160° C+/−3° C. for at least two hours and then 650 grams of the heated asphalt cement was poured into a metallic can. The asphalt-containing can was heated to 170° C.+/−3° C. using a heating mantle. A blade was inserted at an angle at approximately 20° in the middle of the can to provide optimum mixing. The latex prepared according to the method described above was added slowly to the hot asphalt with mixing at 300-325 rpm. Unless otherwise specified, the amount of latex polymer solids added to the asphalt was 3 wt % based on the total solids content of the latex polymer and asphalt. After each addition, time was allowed for most of the bubbling to cease and then the mixer speed was increased to approximately 400-700 rpm to blend the resulting mixture. After latex addition, the mixing was continued for two additional hours to achieve an equilibrated asphalt polymer mixture. Samples of the polymer modified asphalts were taken for viscosity measurement or poured into molds for any desired testing.

SHRP Binder Testing of Latex Polymer-Modified Asphalt

The Strategic Highway Research Program (SHRP) evaluation of latex polymer modified asphalts was carried out according to the ASTM D7175 (2005) procedure on the original latex polymer modified asphalt, on the latex polymer modified asphalt following Rolling Thin-Film Oven (RTFO) exposure, and also on the RTFO conditioned latex polymer modified asphalt that was conditioned in the Pressure Aging Vessel (PAV). The Dynamic Shear Rheometer (DSR) tests measure the dynamic shear modulus and stiffness of the latex polymer modified asphalt. In addition, Bending Beam Rheometer (BBR) testing was carried out according to ASTM D6648 (2001) to measure the low temperature stiffness characteristics of the latex polymer modified asphalt binders. Testing of the original (unaged or fresh) latex polymer modified asphalt and of the latex polymer modified asphalt after RTFO exposure provided the High Temperature in the Performance Grade (PG) scale. Testing of the latex polymer modified asphalt after RTFO and PAV exposure provided the stiffness at intermediate temperatures related to fatigue resistance and BBR testing after RTFO and PAV exposure provided the Low Temperature in the PG scale.

Viscosity of Latex Polymer-Modified Asphalt

The viscosities of the latex polymer modified asphalts prepared according to the methods described above were measured according to ASTM D4402 (2006).

FIG. 1 provides the asphalt viscosity measured at 135° C. for the resulting asphalt preparations using different amounts of the ionic crosslinking agent with a carboxylated styrene-butadiene copolymer (Examples 1-4), with reference to a control using a sulfur-based asphalt (Comparative Example CE5). FIG. 1 demonstrates that the asphalt compositions in Examples 1-4 including the ionically crosslinked carboxylated styrene-butadiene copolymer have comparable viscosities to the asphalt composition in Comparative Example CE5.

Figure 2:
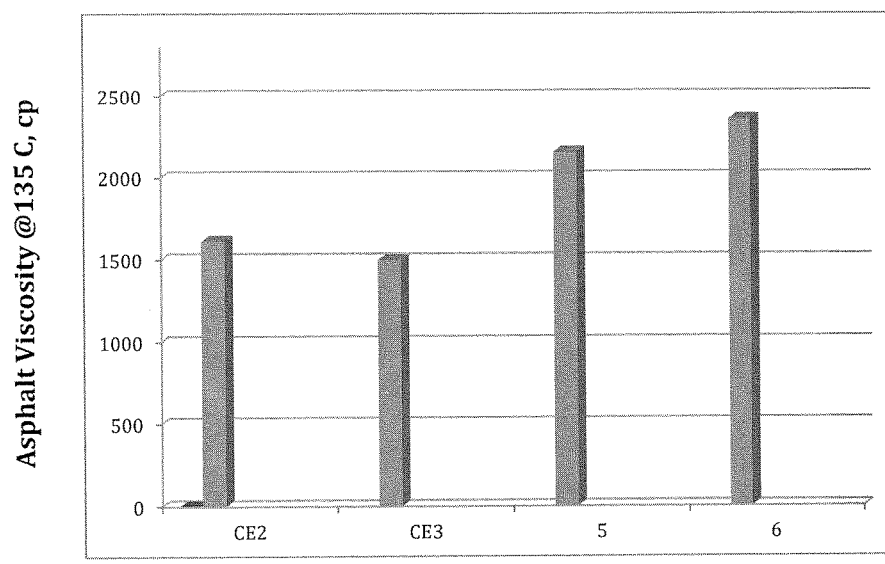
FIG. 2 provides the asphalt viscosity measured in centipoise at 135° C. for the resulting asphalt compositions using 3 wt % of the ionic crosslinking agent (Examples 5 and 6), with reference to two controls using a sulfur-based asphalt (Comparative Examples CE2 and CE3), with a carboxylated styrene-butadiene copolymer.

FIG. 2 provides the asphalt viscosity measured at 135° C. for the resulting asphalt preparations using 3 wt % of the ionic crosslinking agent with a carboxylated styrene-butadiene copolymer (Examples 5 and 6), with reference to two controls using a sulfur-based asphalt (Comparative Examples CE2 and CE3). FIG. 2 demonstrates that asphalt preparations made via ionic crosslinking have higher asphalt viscosities than asphalt preparations made via sulfur-based crosslinking The higher viscosity for the polymer-modified asphalt (using the styrene-butadiene latex and the ionic crosslinker as disclosed herein) indicates that ionic crosslinking has taken place and that it is more pervasive than sulfur crosslinking This can be seen by comparing Examples 5 and 6 with Comparative Examples CE2 and CE4, wherein the viscosities of the same latexes in the same asphalt differ when ionically crosslinked instead of sulfur crosslinked. In applications where a lower asphalt viscosity is desirable, the extent of the ionic crosslinking can be controlled by lowering the amount of the crosslinking agent, for example.

Figure 3:
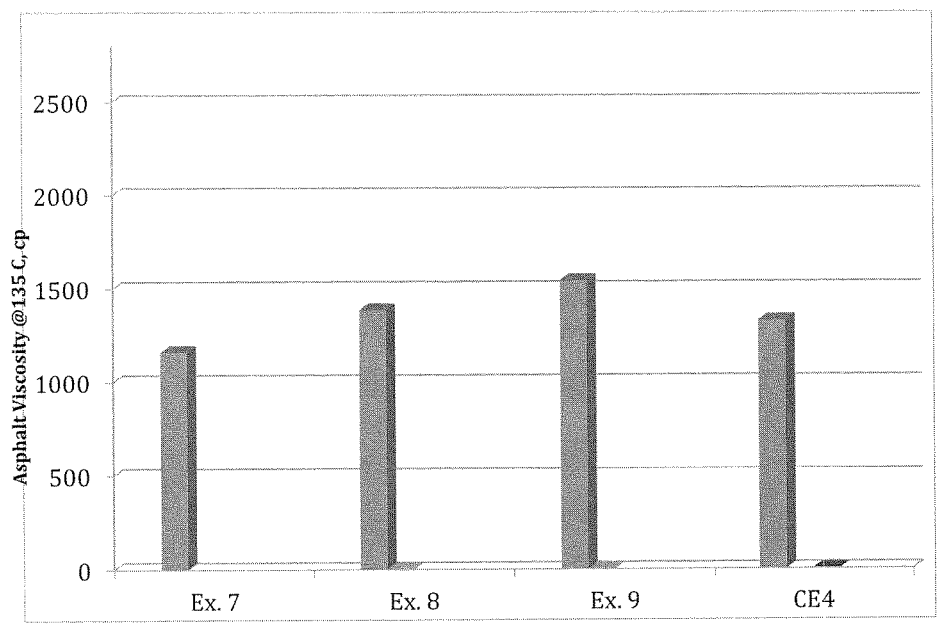
FIG. 3 provides the asphalt viscosity measured in centipoise at 135° C. for the resulting asphalt preparations using 0.2% of an ionic crosslinking agent (Example 7), 1% of an ionic crosslinking agent (Example 8), 2% of an ionic crosslinking agent (Example 9), and 4.2% of a sulfur-based crosslinking agent (Comparative Example CE4) with a carboxylated styrene-butadiene copolymer.

FIG. 3 provides the asphalt viscosity measured in centipoise at 135° C. for the resulting asphalt preparations using 0.2% of an ionic crosslinking agent (Example 7), 1% of an ionic crosslinking agent (Example 8), 2% of an ionic crosslinking agent (Example 9), and 4.2% of a sulfur-based crosslinking agent (Comparative Example CE4) with a carboxylated styrene-butadiene copolymer. FIG. 3 demonstrates that the asphalt compositions in Examples 7-9 including the ionically crosslinked carboxylated styrene-butadiene copolymer have comparable viscosities to the asphalt composition in Comparative Example CE4.

Figure 4:
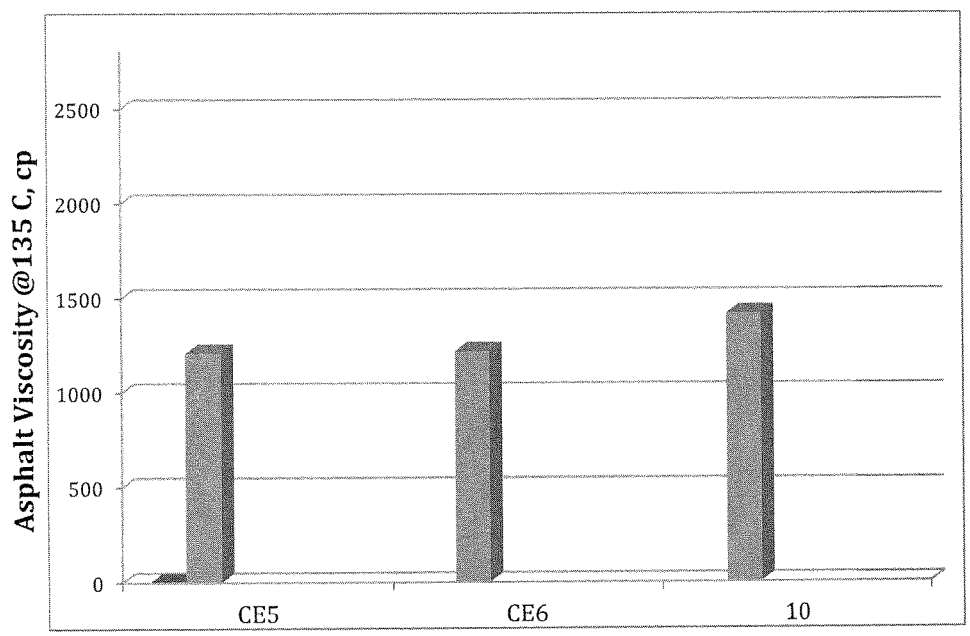
FIG. 4 provides the asphalt viscosity measured in centipoise at 135° C. for the resulting asphalt preparations using 2.0% of an ionic crosslinking agent (Example 10), 2.1% of a sulfur-based crosslinking agent (Comparative Example CE6), or no crosslinking agent (Comparative Example CE5), with a noncarboxylated styrene-butadiene copolymer.
Figure 5:
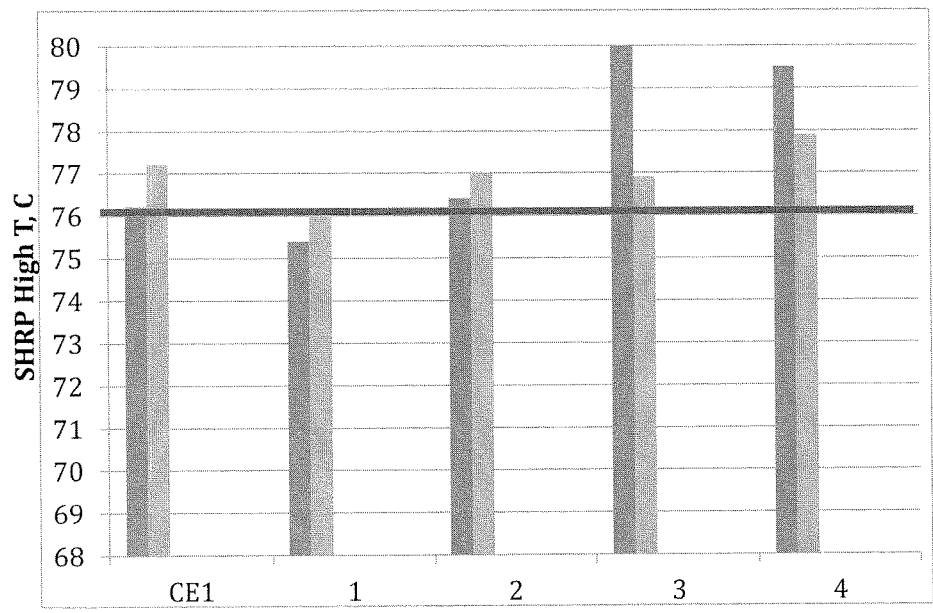
FIG. 5 provides the Fresh and RTFO SHRP High Temperature (° C.) for the resulting asphalt preparations using different amounts of the ionic crosslinking agent (Examples 1-4), with reference to a control using a sulfur-based asphalt (Comparative Example CE1), with carboxylated styrene-butadiene copolymers.

FIG. 4 provides the asphalt viscosity measured in centipoises at 135° C. for the resulting asphalt preparations using 2.0% of an ionic crosslinking agent (Example 10), or 2.1% of a sulfur-based crosslinking agent (Comparative Example CE6), or no crosslinking agent (Comparative Example CE5) with a noncarboxylated styrene-butadiene copolymer. FIG. 3 demonstrates that asphalt preparations made via ionic crosslinking have higher asphalt viscosities than asphalt preparations made via sulfur-based crosslinking or without crosslinking FIG. 5 provides the Fresh and RTFO SHRP High Temperature (° C.) for the carboxylated styrene-butadiene copolymers including different amounts and types of crosslinking agents, namely Comparative Example CE1 and Examples 1-4 (as shown in Table 1). As demonstrated in this figure, the RTFO SHRP High Temperature exceeded 76° C. for each sample, which is two performance grades above the SHRP High Temperature of the NUSTAR 64-22 asphalt without the dispersion.

Figure 6:
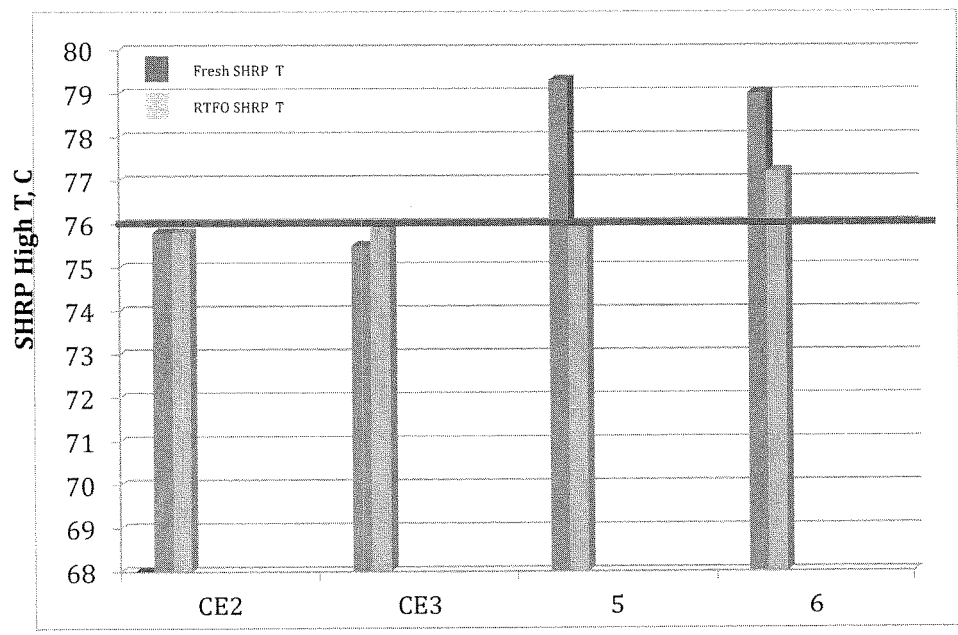
FIG. 6 provides the Fresh and RTFO SHRP High Temperature (° C.) for the resulting asphalt compositions using 3 wt % of the ionic crosslinking agent (Examples 5 and 6) with a carboxylated styrene-butadiene copolymer, with reference to two controls using a sulfur-based asphalt (Comparative Examples CE2 and CE3).

FIG. 6 provides the Fresh and RTFO SHRP High Temperature (° C.) for the carboxylated styrene-butadiene copolymers including different amounts and types of crosslinking agents, namely Comparative Examples CE2 and CE3 and Examples 5 and 6 (as shown in Table 1). As demonstrated in this figure, the SHRP High Temperature exceeded 76° C. for Examples 5 and 6, which is two performance grades above the SHRP High Temperature of the NUSTAR 64-22 asphalt without the dispersion, and which is higher than the values for Comparative Examples CE2 and CE3.

Figure 7:
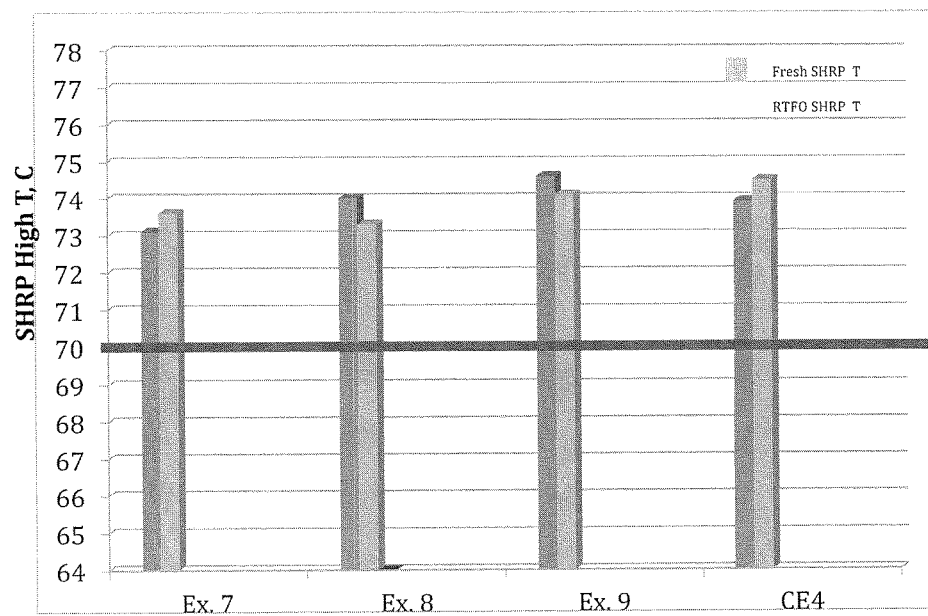
FIG. 7 provides the Fresh and RTFO SHRP High Temperature (° C.) for the resulting asphalt compositions using 0.2% of an ionic crosslinking agent (Example 7), 1% of an ionic crosslinking agent (Example 8), 2% of an ionic crosslinking agent (Example 9), and 4.2% of a sulfur-based crosslinking agent (Comparative Example CE4) with a carboxylated styrene-butadiene copolymer.

FIG. 7 provides the Fresh and RTFO SHRP High Temperature (° C.) for the resulting asphalt compositions using 0.2% of an ionic crosslinking agent (Example 7), 1% of an ionic crosslinking agent (Example 8), 2% of an ionic crosslinking agent (Example 9), and 4.2% of a sulfur-based crosslinking agent (Comparative Example CE4) with a carboxylated styrene-butadiene copolymer. As demonstrated in this figure, the SHRP High Temperature exceeded 70° C. for levels of the ionic crosslinking agent in the 0.2 wt %-2 wt %, which is one performance grade above the SHRP High Temperature of the NUSTAR 64-22 asphalt without the styrene-butadiene dispersion, and which is equal to the SHRP High Temperature of Comparative Example CE4.

Figure 8:
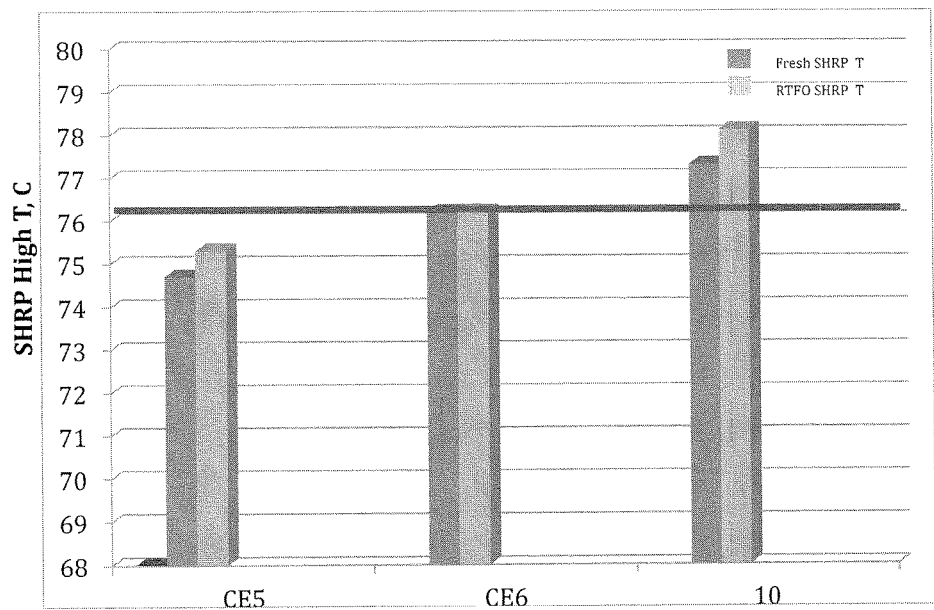
FIG. 8 provides the Fresh and RTFO SHRP High Temperature (° C.) for the resulting asphalt preparations using 2.0% of an ionic crosslinking agent (Example 10), 2.1% of a sulfur-based crosslinking agent (Comparative Example CE6), or no crosslinking agent (Comparative Example CE5), with a noncarboxylated styrene-butadiene copolymer.

FIG. 8 provides the Fresh and RTFO SHRP High Temperature (° C.) for the noncarboxylated styrene-butadiene copolymers including different amounts and types of crosslinking agents in Comparative Examples CE5 and CE6 (as shown in Table 1) and Example 10. As demonstrated in this figure, the SHRP High Temperature exceeded 76° C. for Example 10, which is two performance grades above the SHRP High Temperature of the NUSTAR 64-22 asphalt without the dispersion, and which is higher than the value for Comparative Example CE6 using a sulfur-based crosslinking agent.

Table 3 below shows elastic recovery results (ER 10C SG 20cm 5mn, %) for the Comparative Examples CE1-4 and Examples 1-3 and 5-9. These values were determined using a ductilometer according to the procedure described in the ASTM D6084 Procedure B (2006) testing protocol. Table 4 provides the texture scale for these tests.

TABLE 3

|  | Trial 1 | Trial 2 | Trial 3 |
| --- | --- | --- | --- |
| CE1 | 62.5% | 63.75% | 63.75% |
| CE2 | 67.5% | 67.5% | 67.5% |
| CE3 | 66.25% | 67.5% | 67.5% |
| CE4 | 60% | 58.75% | Not done |
| CE5 | Not done | Not done | Not done |
| CE6 | Not done | Not done | Not done |
| 1 | 56.25% | 57.5% | 58.75% |
| 2 | 63.75% | 63.75% | 65% |
| 3 | 62.50% | 63.75% | 63.75% |
| 4 | Not done | Not done | Not done |
| 5 | 61.25% | 61.25% | Not done |
| 6 | 63.75% | 63.75% | not done |
| 7 | 50% | 51.25% | Not done |
| 8 | 53.75% | 55% | Not done |
| 9 | 53.75% | Broke | Not done |
| 10 | Not done | Not done | Not done |

All the ER values in Table 3 were above 50%, which is the minimum required by the transportation departments of many U.S. states.

Table 4 below shows the texture results (ER Texture and/or Mixing Texture) of the Comparative Examples CE1-CE4 and Examples 1-3 and 5-9. In instances where two texture ER Texture results were measured, both values are provided in the table below.

TABLE 4

|  | ER Texture | Mixing Texture |
| --- | --- | --- |
| CE1 | 4 | 4 |
| CE2 | 3.5 | 4 |
| CE3 | 3.5 | 4 |
| CE4 | 4, 4.5 | 5 |
| CE5 | N/A | N/A |
| CE6 | N/A | N/A |
| 1 | 4 | 4 |
| 2 | 3 | 4 |
| 3 | 2 | 4 |
| 4 | N/A | 5 |
| 5 | 1 | 1 |
| 6 | 1 | 1 |
| 7 | 4, 4 | 5 |
| 8 | 3.5, 3.5 | 4 |
| 9 | 3.5, 3.5 | 3.5 |
| 10 | N/A | N/A |

The Texture Scale (for ER Texture and Mixing Texture) is in Table 5, below.

TABLE 5

Texture Scale

| Texture Scale | Points |
| --- | --- |
| Very Rough, Very Bad | 0 |
| Medium | 1 |
| Slight-to-Medium | 2 |
| Slight | 3 |
| Very Slight | 4 |
| Good | 5 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of "and "consisting of "can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. An asphalt composition comprising:
asphalt; aggregate; and
a crosslinked product prepared by ionically crosslinking a random copolymer derived from styrene and butadiene using an ionic crosslinking agent.

2. The asphalt composition according to claim 1, wherein the Strategic Highway Research Program (SHRP) fresh high temperature, Rolling Thin-Film Oven (RTFO) SHRP high temperature, or both of the asphalt composition is at least 1 PG (performance grade) improvement over an identical asphalt composition without the ionic crosslinking agent.

3. The asphalt composition according to claim 1, wherein the asphalt provides sites for ionic crosslinking.

4. The asphalt composition according to claim 1, wherein the random polymer is a carboxylated styrene-butadiene copolymer.

5. The asphalt composition according to claim 4, wherein the carboxylated styrene-butadiene random copolymer is derived from a carboxylic acid monomer in an amount of 0.5-10% by weight.

6. The asphalt composition according to claim 1, wherein the polymer is a non-carboxylated styrene-butadiene copolymer.

7. The asphalt composition according to claim 1, wherein the ionic cross-linking agent has a valency of at least 2.

8. The asphalt composition according to claim 1, wherein the ionic cross-linking agent has a valency of at least 3.

9. The asphalt composition according to claim 1, wherein the crosslinked product is free of sulfur.

10. An asphalt composition, comprising:
asphalt; and
a crosslinked product prepared by ionically crosslinking a random copolymer derived from styrene and butadiene using an ionic crosslinking agent, wherein the random polymer is further derived from glycidyl methacrylate, N-methylolacrylamide, or a combination thereof.

11. An asphalt composition, comprising:
asphalt; and
a crosslinked product prepared by ionically crosslinking a random copolymer derived from styrene and butadiene using an ionic crosslinking agent, wherein the ionic crosslinking agent includes zirconium.

12. A method of producing an asphalt composition, comprising:
blending a random copolymer derived from styrene and butadiene, an ionic crosslinking agent, and asphalt at a blending temperature of 5° C. to 200° C.; and
ionically crosslinking the random copolymer with the ionic crosslinking agent to form a crosslinked composition; and
adding aggregate to the crosslinked composition.

13. The method according to claim 12, wherein the random polymer is formed using emulsion polymerization.

14. The method according to claim 13, wherein the emulsion polymerization is conducted at a temperature of 5° C. to 90° C.

15. The method according to claim 12, wherein the blending temperature is from 5° C. to 60° C.

16. The method according to claim 12, wherein the blending temperature is ambient temperature.

* * * * *